United States Patent
Cha (12)

(10) Patent No.: US 6,747,250 B1
(45) Date of Patent: Jun. 8, 2004

(54) COUNTER-TOP ELECTRIC OVEN

(75) Inventor: KeonJong Cha, Pusan (KR)

(73) Assignee: Morning Electronics Co. Ltd., Pusan (KR)

( * ) Notice: Subject to any disclaimer, the term of this patent is extended or adjusted under 35 U.S.C. 154(b) by 0 days.

(21) Appl. No.: 10/340,814

(22) Filed: Jan. 10, 2003

(51) Int. Cl.[7] .............................. A21B 1/26; A21B 1/50; A47J 37/00; A47J 36/16; A47J 36/34
(52) U.S. Cl. .................... 219/400; 219/386; 219/392; 219/411; 99/380; 99/447; 99/446; 99/476
(58) Field of Search ................... 219/386, 392, 219/400, 411; 99/330, 444, 446, 447, 476

(56) References Cited

U.S. PATENT DOCUMENTS

| | | |
|---|---|---|
| 369,274 A | 4/1887 | Dornbush et al. |
| 3,851,639 A | 12/1974 | Beddoe |
| 3,882,767 A | 5/1975 | Oyler, deceased et al. |
| 4,350,874 A * | 9/1982 | Nishikawa .................. 219/400 |
| 4,817,509 A | 4/1989 | Erickson |
| 5,165,328 A | 11/1992 | Erickson et al. |
| 5,217,545 A | 6/1993 | Smith et al. |
| 5,329,919 A | 7/1994 | Chang |
| 5,338,616 A | 8/1994 | Ishii et al. |
| 5,403,607 A | 4/1995 | Erickson et al. |
| 5,404,420 A | 4/1995 | Song |
| 5,438,916 A | 8/1995 | Dornbush et al. |
| 5,465,651 A | 11/1995 | Erickson et al. |
| 5,466,912 A | 11/1995 | Dornbush et al. |
| 5,484,621 A | 1/1996 | Erickson et al. |
| 5,513,558 A | 5/1996 | Erickson et al. |
| 5,520,096 A | 5/1996 | Dornbush et al. |
| 5,699,722 A | 12/1997 | Erickson et al. |
| 5,845,563 A | 12/1998 | Haring et al. |
| 6,201,217 B1 | 3/2001 | Moon et al. |
| 2003/0062360 A1 * | 4/2003 | Moon et al. ................. 219/400 |

* cited by examiner

*Primary Examiner*—Joseph Pelham
(74) *Attorney, Agent, or Firm*—Kelly Bauersfeld Lowry & Kelley, LLP (57) ABSTRACT

A counter-top electric oven includes a head having an electric heating unit. The heating unit includes a heating lamp and a grill underlying the heating lamp. A motor powers two fans for circulating air around the motor, and through the heating unit. An oven body removably receives at least a portion of the electric heating unit, and is supported by a dish. The head, oven body and dish form an interior cavity for cooking food. An expansion ring may be disposed between the oven body in the dish to enlarge the cooking enclosure area. A base supports the dish on the flat surface, such as a counter-top. A holder is slidably connected to the base so as to be extended away from the base for supporting the head and oven body when these are moved to an open position.

25 Claims, 8 Drawing Sheets

FIG. 15

# COUNTER-TOP ELECTRIC OVEN

BACKGROUND OF THE INVENTION

The present invention relates to electric ovens. More particularly, the present invention relates to a counter-top electric cook oven.

Counter-top electric ovens are known in the art. In comparison to conventional ovens, counter-electric ovens typically offer the advantage of being less bulky and having quicker cooking times. It is common for counter-top ovens to include a heating unit within a power head thereof which is used to heat the cooking enclosure. To reduce the cooking time, counter-top electric ovens typically rely on a hot airstream that is circulated around the food within the oven by a fan associated with the heating unit. It is also common for the interior of the cooking enclosure in such ovens to be accessed by manually lifting an upper portion of the cooking enclosure from the remainder of the cooking enclosure.

To reduce the weight of counter-top electric ovens for portability and to provide a cooking enclosure that allows viewing of the cooking operation, counter-top electric ovens typically utilize plastic materials for a majority of their housings, including for the cooking enclosure or body.

The cooking oven disclosed in U.S. Pat. No. 6,201,217 to Moon et al. discloses the use of a heating element made of incoloy material coated with a ceramic coating in order to provide heat radiation in infrared range to heat the contents of the oven. However, it has been found that such a heating element does not produce ozone, which can further serve to filter malodorous smoke. Additionally, the '217 patent discloses a lower oven dish comprised of metal having wire retractable handles. However, the metal dish can become extremely hot, to the point of melting a plastic base. Such metal dishes also cool rapdily once the heat source is removed. Additionally, the dish is very difficult to handle, such as when emptying the grease contents thereof after cooking.

It is often desirable to remove the head or cooking body enclosure from the oven in order to determine whether the food items within the oven have been sufficiently cooked. However, the oven body enclosure itself becomes quite hot during the operation of the oven. Thus, handling the enclosure and head becomes difficult, and placement of the enclosure or head on a surface, such as a counter-top, can burn the surface.

Lastly, it would of great benefit to provide such an electric counter-top oven which could be increased in capacity so as to cook larger food items, such as a large turkey as opposed to a smaller turkey.

Accordingly, there is a continuing need for an improved electric counter-top oven.

SUMMARY OF THE INVENTION

The present invention resides in a counter-top electric oven which includes a head having an electric heating unit. The electric heating unit comprises a heating lamp and a grill underlying the heating lamp. A motor is housed within the head and has a shaft connected to a first fan for cooling the motor, and a second fan for circulating air through the heating unit. Apertures are formed in the top surface of the head for introducing air within the head, and a plurality of apertures formed in the skirt of the head for venting the air horizontally from the head. A cooling chamber is configured to surround at least a portion of the heating unit. An electronic control circuit is used to control the motor and the heating unit, so as to control the heating time and temperature.

An oven body, preferably comprised of a clear plastic, has an upper opening configured to removably receive at least a portion of the electric heating unit therein. A dish is disposed below the oven body which has an upper circumferential lip for accepting a lower edge of the body. The dish is preferably comprised of a glass material. Typically, handles are formed integrally therewith for ease of handling.

A rack rests on the dish within the oven. The rack preferably includes a first set of support legs extending from the rack, and a second set of support legs of a different length extending from the opposite side of the rack for supporting the rack at different heights relative to the dish within the oven.

An expansion ring may be disposed between the oven body and the dish in order to enlarge the cooking enclosure area of the oven.

A base partially surrounds the dish for supporting the dish on a flat surface. A holder is slidably connected to the base so as to be retracted towards the base for selective opening of the oven.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the drawings for purposes of illustration, the present invention resides in a counter-top electric oven, generally referred to by the reference number 10.

Figure 1:
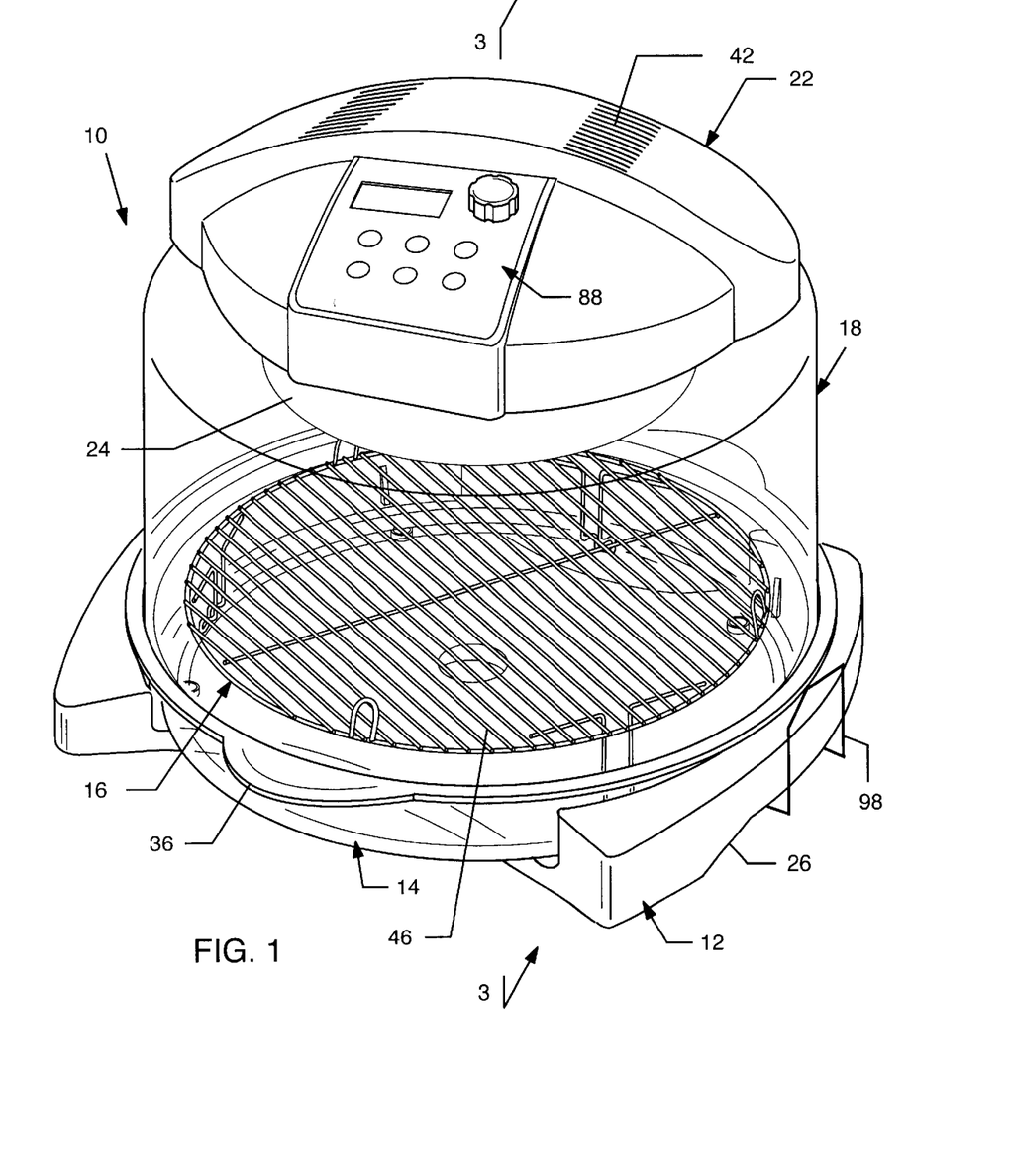
FIG. 1 is a perspective view of an counter-top electric oven embodying the present invention.
Figure 2:
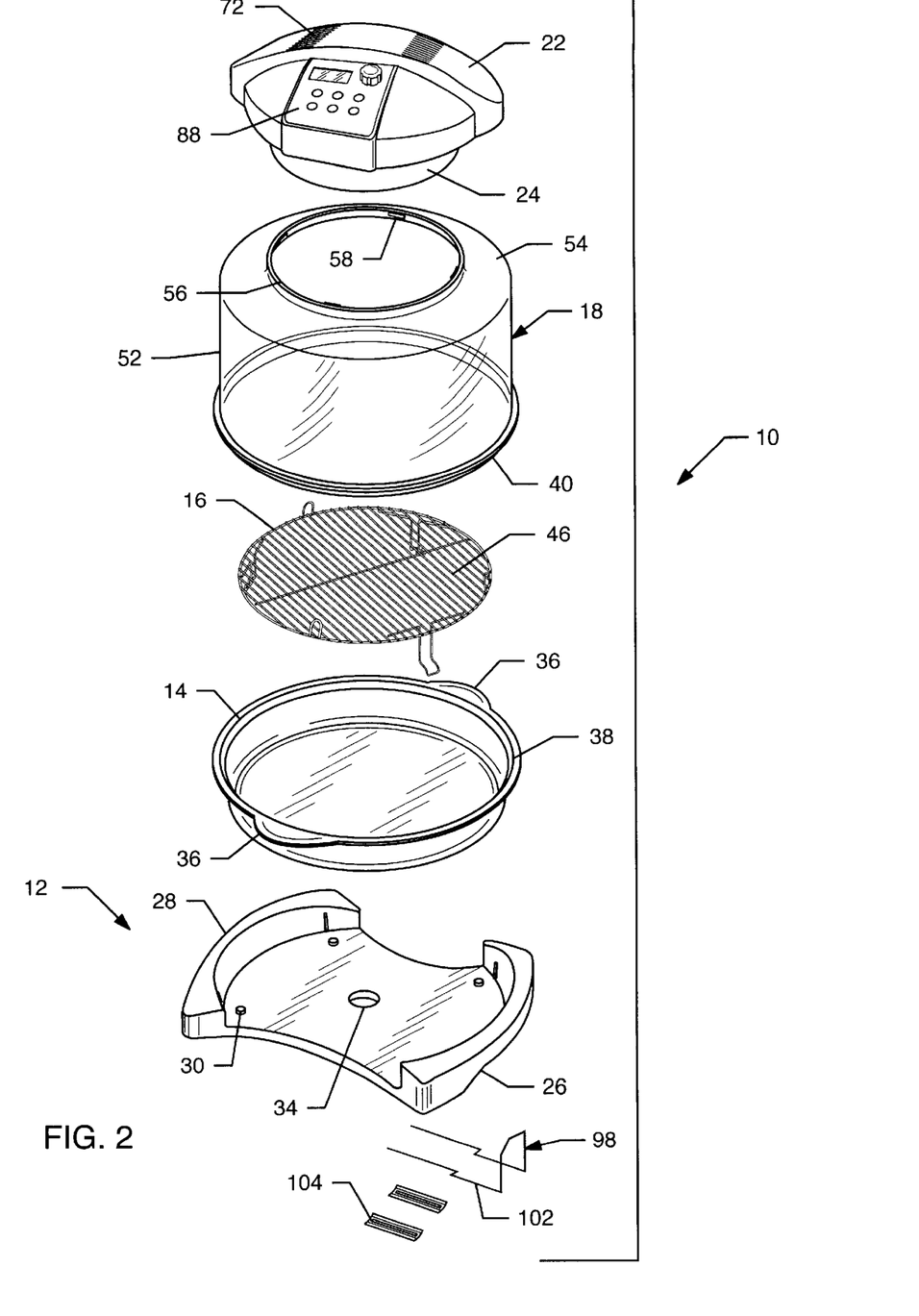
FIG. 2 is an exploded perspective view of the component parts of the electric oven.

With reference to FIGS. 1 and 2, the oven 10 includes a base 12 for supporting the oven 10 on a flat surface, such as a counter-top. The base 12 is configured to support a glass cooking dish 14 which forms a lower portion of a cooking chamber of the oven 10. A rack 16 rests in the dish 14 for supporting the food to be cooked thereon. An oven body 18, which is preferably generally cylindrical and transparent, is supported by the dish 14. As shown in FIG. 2, the body 18 includes an upper aperture 20 which is sized and configured to removably receive a head or cover 22 of the oven 10. More particularly, as will be more fully discussed herein, the aperture 20 is sized so as to receive a heating unit 24 of the head 22. An internal cooking chamber is formed when the dish 14, body 18 and head 22 are connected to one another.

Figure 3:
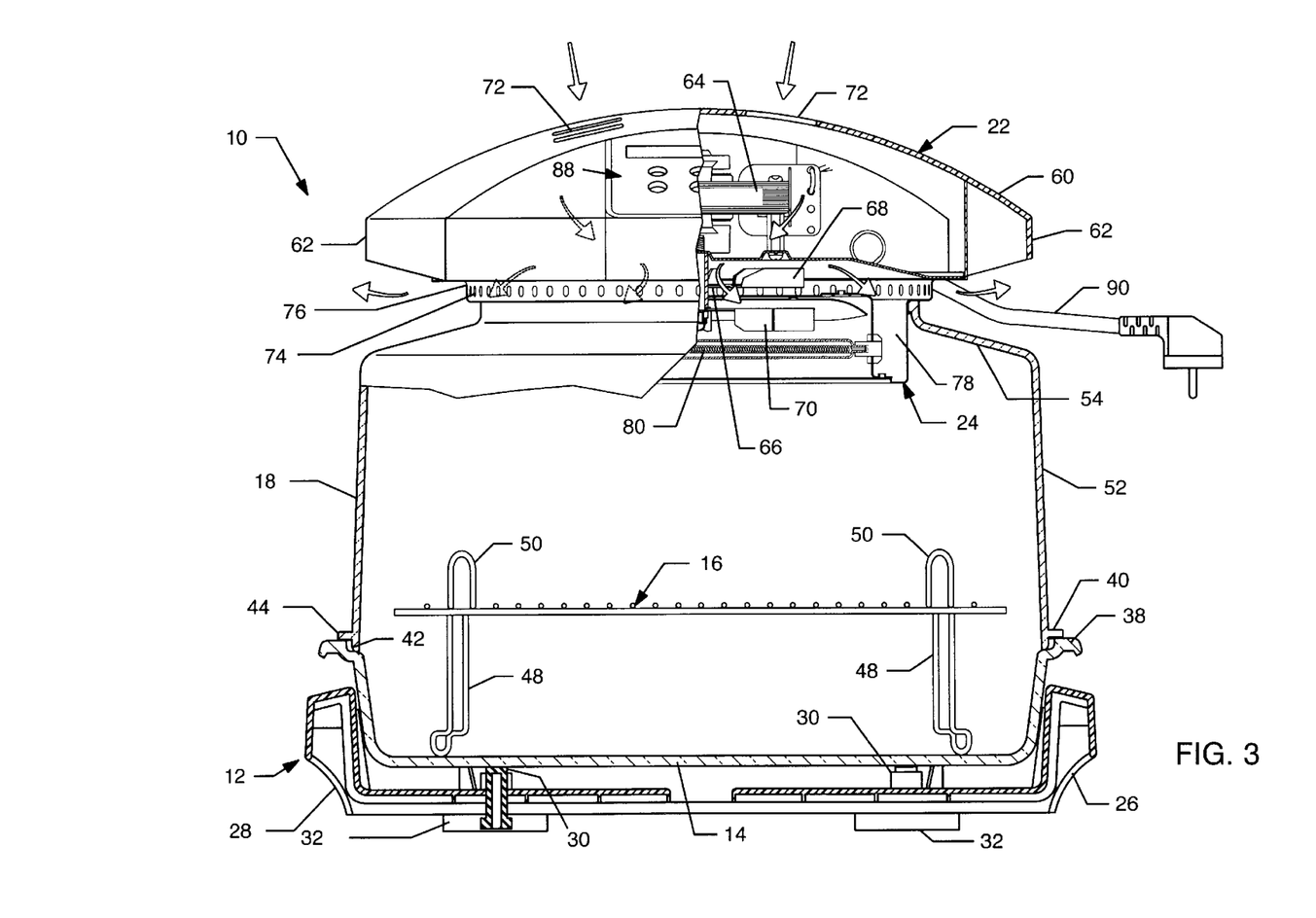
FIG. 3 is a partially fragmented and cross-sectional view of the oven of FIG. 1, illustrating internal components of a power head thereof.

With reference now to FIGS. 2 and 3, many of the components of the oven are comprised of plastic material in order to provide the oven 10 at a relatively low cost, render the oven 10 lightweight and also to provide a degree of insulation. In keeping with these objectives, the base 12 is preferably comprised of a plastic material. As shown in FIG. 1, the base 12 is configured to partially surround the dish 14. By only partially surrounding the dish 14, the base 12 is not prone to overheating or melting due to trapped heat between the base 12 and the dish 14. By only partially surrounding the dish 14, the base 12 allows release of heat more quickly. Outer edges 26 and 28 of the base are formed such so as to be used as handles to allow a user to move the oven 10 from one location to another. The base 12 further includes one or more supports 30 for the dish 14. Typically, such supports 30 are comprised of a thermal insulator, such as a suitable silicone rubber insulating material so that only minimal contact is made between the base 12 and the dish 14. The base 12 also includes support legs 32 for elevating the base 12 with respect to the counter-top or other flat surface. Such support legs 32 may include a rubber pad or coating to prevent scratching or marring of the flat surface, and to prevent unwanted sliding of the oven 10 on the surface. With particular reference to FIG. 2, the base 12 may also include one or more apertures 34 therethrough which further allows any trapped heat to escape from the base 12 to prevent damage thereto.

With continuing reference to FIGS. 1–3, the dish 14 is preferably comprised of a glass material in order to enable the user to view the contents thereof, and which also serves as a superior insulating material. Although it takes more time to heat the glass dish 12, the glass dish 12 will release heat more slowly, keeping the food warm longer. Also, by utilizing glass dish 14 as opposed to a metallic dish or pan, damage to the base 12 is lessened and heat is maintained within the cooking chamber due to the insulative qualities of the glass material.

In a particularly preferred embodiment, handles 36 are integrally formed with the dish 14 so as to extend from opposite sides thereof to allow a user to lift and move the dish 14 as necessary. Typically, the handles 36 will be disposed in the open portions of the base 12, as illustrated.

As best shown in FIG. 3, the dish 14 includes an upper circumferential lip 38 which is configured to receive a lower edge 40 of the body 18. A lower portion of the body edge 42 extends slightly below the upper edge of the dish rim 38, while an outwardly projecting lip 44 of the body 18 rests on the rim 38 of the dish 14. In this manner, the oven body 18 is securely held to the dish 14 and the leakage of hot gases, such as steam, from the cooking chamber is nearly completely eliminated.

The cooking rack 16 includes a generally planar grid 46 or grill for supporting food items that are being cooked. A first set of support legs 48 extend from a surface of the rack so as to support the rack 16 within the cooking chamber. In a particularly preferred embodiment, a second set of support legs 50 which are shorter than support legs such that the rack 16 can be inverted to accommodate larger food items within the cooking chamber. Thus, two cooking heights are provided by rack 16. Preferably, rack 16 is made of metal, such as stainless steel, with a suitable non-stick coating, such as PTFE.

The oven body or enclosure 18 has a generally cylindrical sidewall 52 that blends into a generally conical-shaped upper wall 54 which in turn blends into a generally cylindrical ring 56 which defines the upper aperture 20 into which the head 22 is inserted. The upper ring 56 is configured such so as to receive a lower heating unit 24 portion of the head 22 and form a generally air-tight seal therebetween. The upper ring 56 may include tabs 58 or slots which engage corresponding tabs or slots of the head 22 such that the head 22 can be turned, such as a quarter turn, to lock the head 22 in place relative to the body 18. Preferably, the oven body 18 is formed from a suitable transparent plastic material, such as polycarbonate.

With reference now to FIGS. 3–12, the head 22 includes an exterior cover or housing 60, preferably comprised of a plastic material, which is generally domed-shaped. The cover 60 forms a pair of handles 62 on opposite lower ends thereof. The cover 60 houses an internal motor 64 having a shaft 66 connected to a first cooling fan 68, also housed within cover 22, and a heating fan 70 disposed within the heating unit. Apertures 72 are formed in an upper surface of the cover 60 to allow the in-flow of cooling air into the head 22. As shown by the directional arrows in FIG. 3, the cooling fan 68 cools air through the cover aperture 62, directly over motor 64, and out apertures 74 formed in a lower generally cylindrical skirt 76 which serves as a vent. It will be noted that the aperture 74 comprises a series of apertures which are horizontally directed such that the air flow is directed away from the oven 10 after cooling motor 64. At least a portion of the air is distributed through a cooling chamber 78 surrounding the heating unit 24 to prevent overheating of the components of the heating unit 24.

With particular reference to FIGS. 5–12, components of the heating unit 24 are illustrated. As shown in FIG. 2, the heating unit 24 extends downwardly from a lower portion of the head 22 and is of generally cylindrical nature so as to mate with the upper rim 56 of the oven body 18. Within the heating unit 24 is the heating fan 70 which is connected to motor 64, as described above. A heating element, in the form of a halogen lamp 80, is positioned below the heating fan 70. The halogen lamp 80 produces high infrared heat output. The halogen lamp 80 includes electrical leads 82 for powering the lamp 80. A grill 84 overlies the lamp 80. The grill 84 is preferably coated by mixing coating powder comprised of ceramic powder and heat-resistant paint. When this mixture is heated by a heating element, such as the halogen lamp 80, typically between temperatures of 60° to 500° C., it starts to generate infrared radiations. These infrared radiations penetrate into food and quicken cooking time and render the foods juicier. However, the majority of the infrared radiation and its heat is generated by the halogen lamp 80 heating element which produces a temperature between 300°–400° C. The grill 84 also serves to protect the lamp 80 and fan 70 from accidental breakage, or objects which may be emitted from the cooking food during operation of the oven 10. One of the aspects of utilizing a halogen lamp 80 as opposed to other electrical heating elements is that the light emitted from the halogen lamp 80 creates a small amount of ozone in the heating chamber which serves to filter smoke while the food is cooked. The heating fan 70 and halogen lamp 80 are encased within a inner wall 86 of the heating unit 24 which preferably has a reflective inner surface so as to reflect any heat generated by the heating unit 24 to prevent heat loss. The heating fan 70 is driven at a sufficient speed so as to provide an adequate air flow within the cooking chamber to create a relatively even temperature throughout the cooking chamber to speed the cooking of food by convection to supplement the infrared heating.

Figure 4:
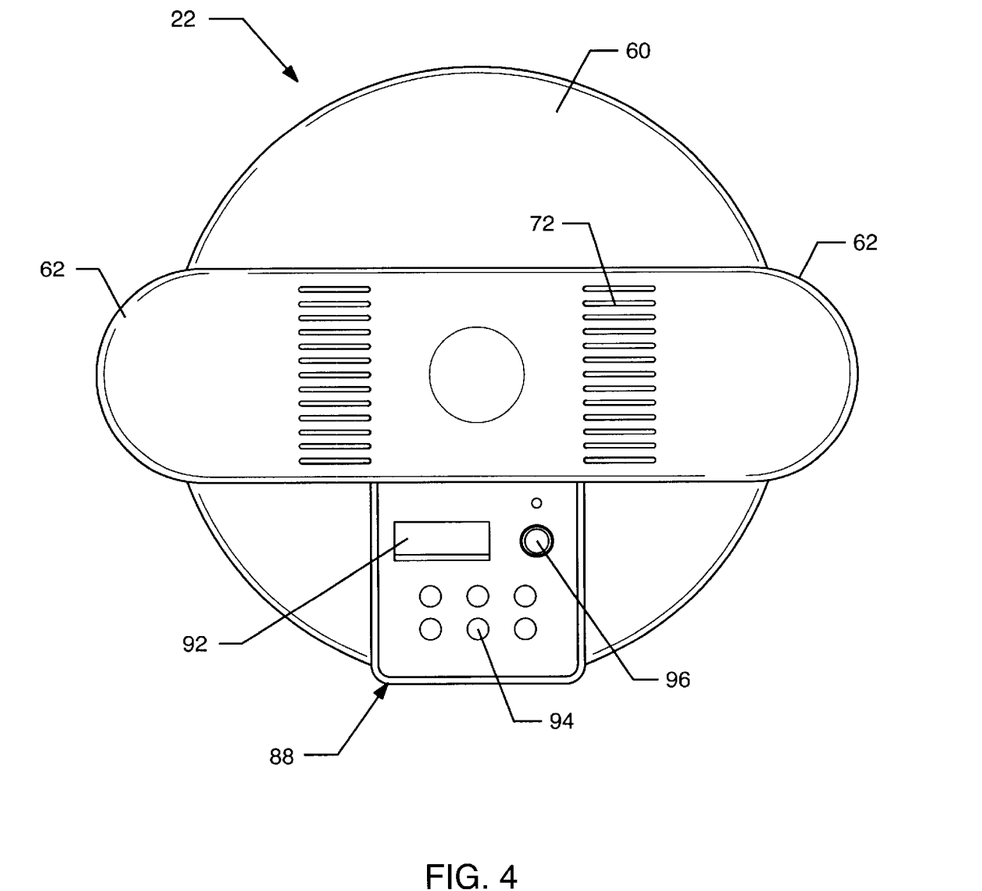
FIG. 4 is a top plan view of the electric oven.
Figure 5:
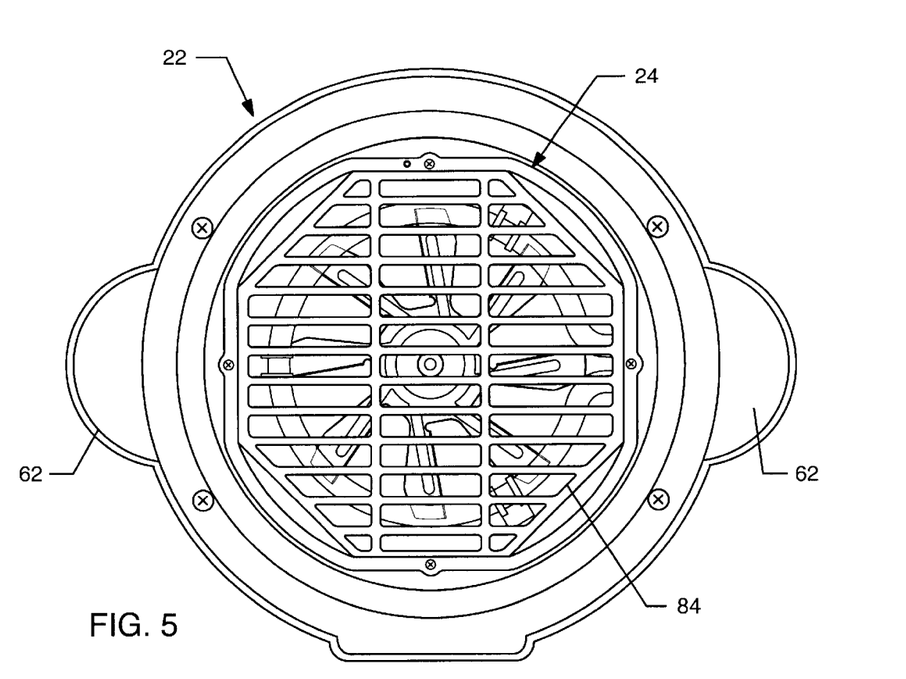
FIG. 5 is a bottom plan view of a heating unit of the head of the electric oven.
Figure 6:
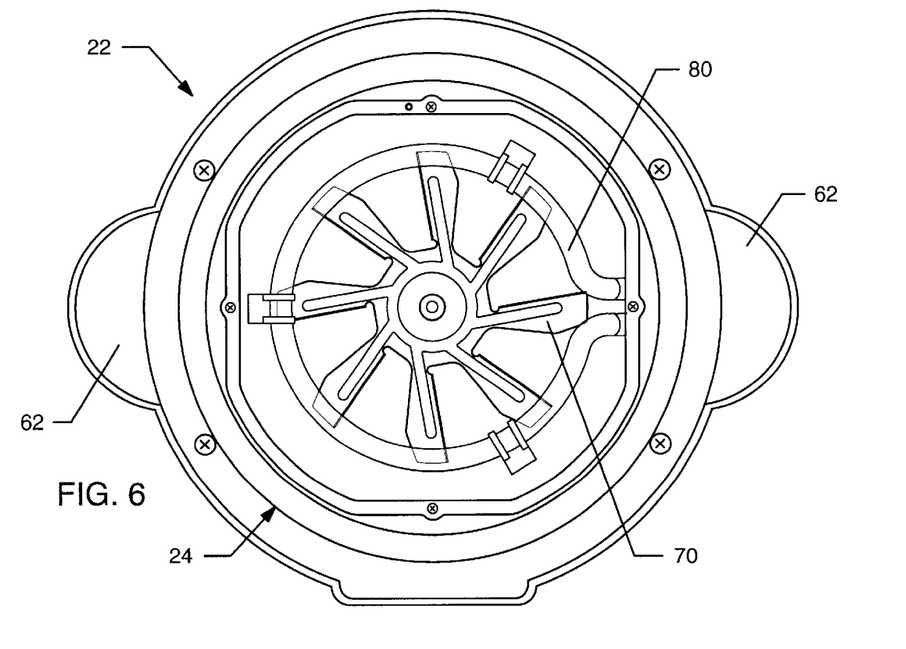
FIG. 6 is a bottom plan view similar to FIG. 5, with a grill thereof removed.
Figure 7:
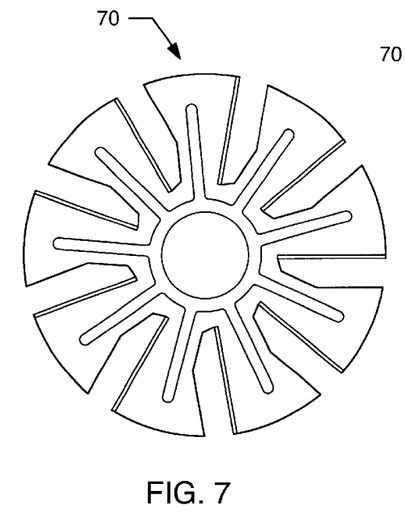
FIG. 7 is a top view of a heating fan used in accordance with the present invention.
Figure 8:
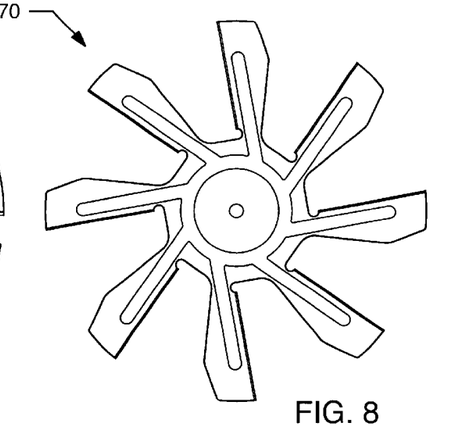
FIG. 8 is a bottom view of the heating fan.
Figure 9:
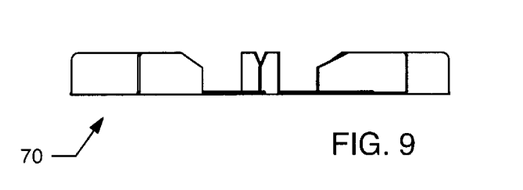
FIG. 9 is a side elevational view of the heating fan.
Figure 10:
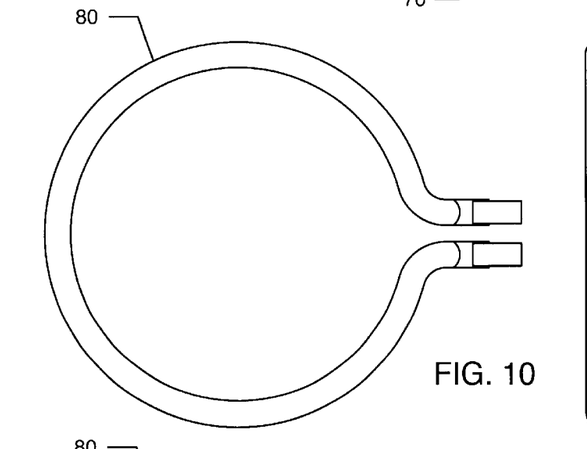
FIG. 10 is a top plan view of a halogen heating lamp used in accordance with the present invention.
Figure 11:
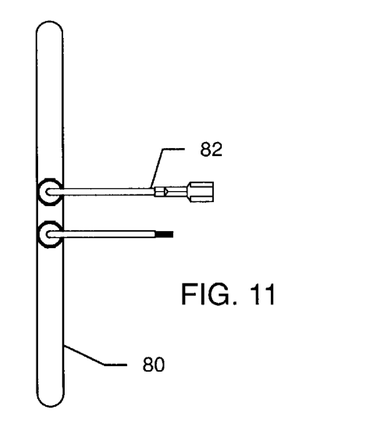
FIG. 11 is an end view of the heating lamp.
Figure 12:
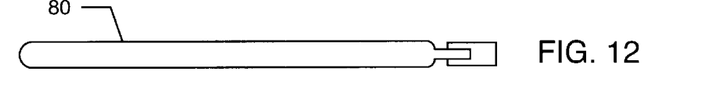
FIG. 12 is a side elevational view of the heating lamp.

With reference now to FIG. 4, a control panel 88 is provided on the head 22 for controlling the motor 64 speed and the intensity of the light generated by the halogen lamp 80. The control panel 88 has power supplied thereto by an electrical cord 90, illustrated in FIG. 3, and includes a display 92 and various buttons 94 and dials 96 for altering the cooking time, cooking temperature, automatic cooking time periods, etc.

In use, the dish 14 is placed upon base 12 and the rack 16 is disposed within dish 14 at the appropriate height for the food to be cooked. Body 18 is disposed on the dish 14, as described above, and the power head 22 is attached to base 18. The user utilizes control panel 88 to select a proper cooking temperature and time. As will appreciated by those skilled in the art, the body 18 becomes quite hot during operation of the oven 10. In the past, this has made it difficult to open the oven 10 to test the food being cooked therein.

Figure 13:
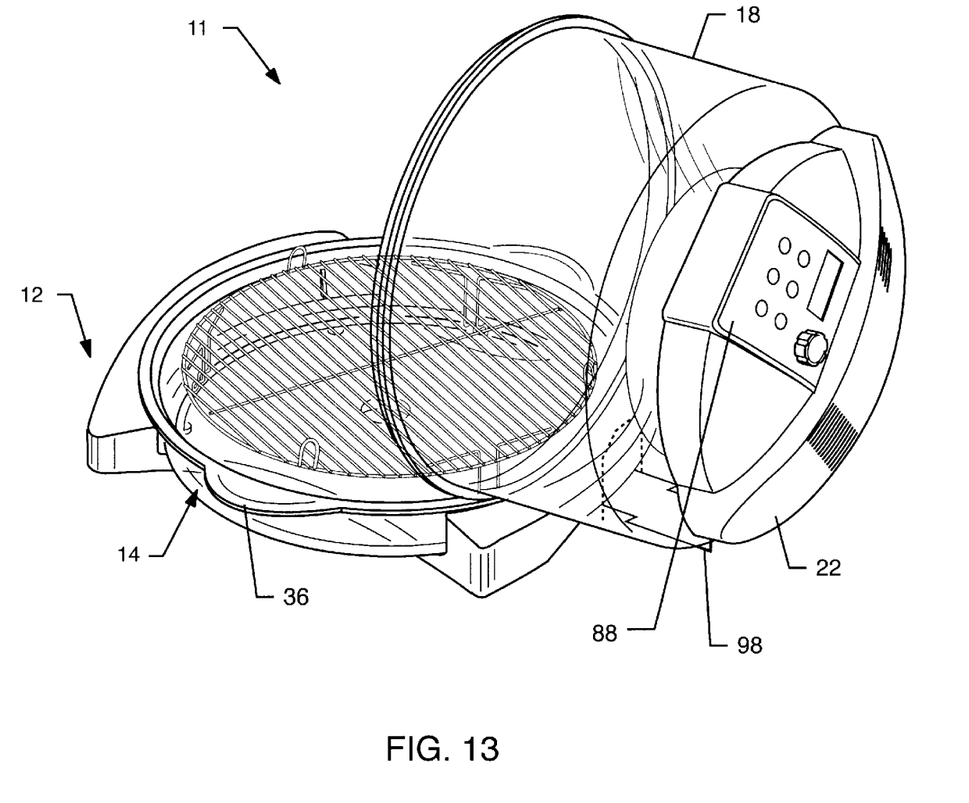
FIG. 13 is a perspective view of the electric oven having a head and upper oven body pivoted into an open position and resting upon an extended holder.

With particular reference to FIGS. 2 and 13, the oven 10 of the present invention includes a holder 98 which is typically in the form of a single metal wire bent to an appropriate shape to accommodate and hold the oven body 18 or head 22. As shown in FIG. 1, the holder 98 is retractable towards the base 12 so as to not interfere with the transport or storage of the oven 10. However, when a user needs to test the food within the oven 10, the holder 98 can be extended from the base, as illustrated in FIG. 13, and the head 22 and body 18 tipped over to expose the cooking food. Although the body 18 is relatively hot, the head 22 is not and the user can grasp the head and merely tip the head 22 and body 18 to an open position upon the holder 98. This eliminates any need for contact with the body 18, and alleviates any concerns of placing the heated body 18 on a surface which could be damaged. As illustrated in FIG. 2, the holder 98 is comprised of an upper neck 100 which serves to support the body 18 and head 22, and extending arms 102 which are slidably received within the tracks 104 which are attached to the base 12.

Figures 14, 15:
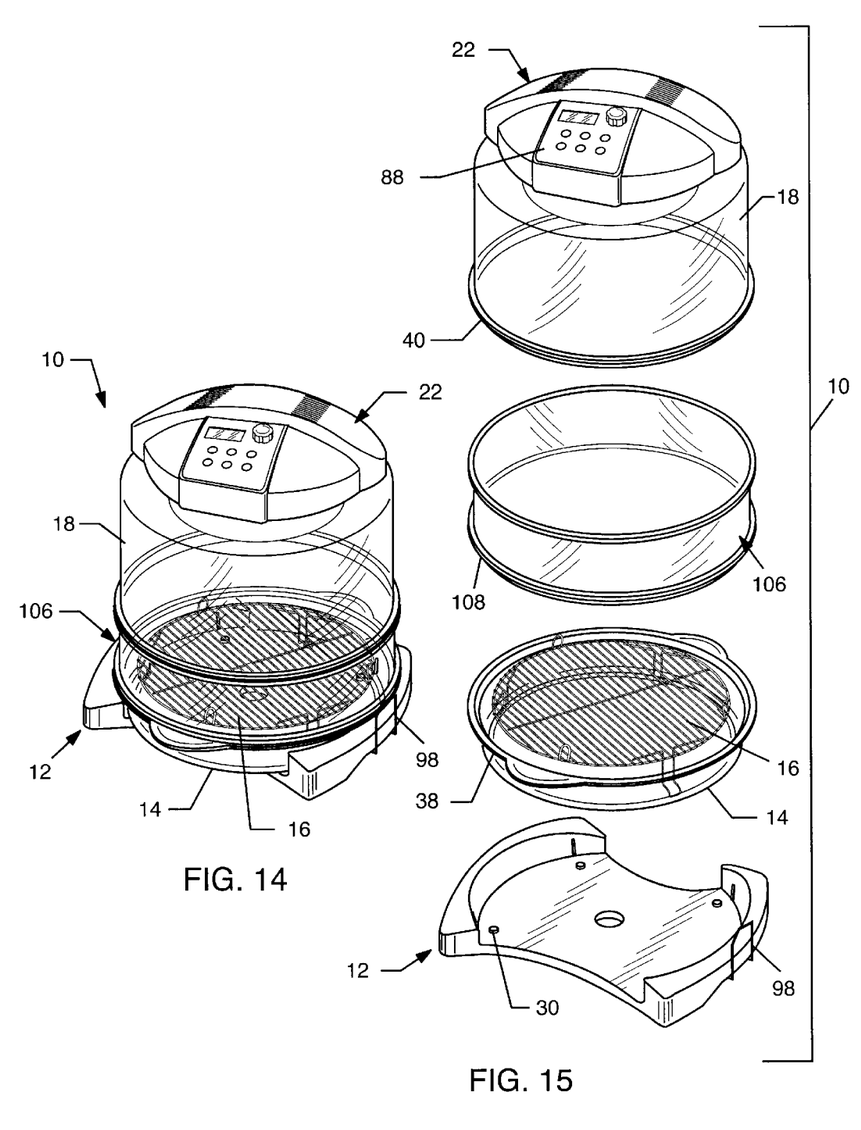
FIG. 14 is a perspective view of the electric oven of the present invention having an expansion ring.
FIG. 15 is an exploded perspective view of the electric oven with the expansion ring.

With reference now to FIGS. 14 and 15, although the oven 10 in its normal configuration can accommodate a large number of food items, such as relatively large roasts, chickens, turkeys, etc., there are instances when the cooking chamber must be enlarged so as to accommodate a larger item, such as a fifteen pound turkey as opposed to a ten pound turkey. The present invention overcomes this problem with the use of an extension ring 106 which is of approximately the same diameter and of the same material as the oven body 18 and which includes a lower rim 108 configured to engage the upper rim of dish 14, and an upper rim 110 configured to engage the lower edge 40 of the oven body 18. Insertion of the extension ring 106 between the dish 14 and oven body 18 effectively enlarges the cooking chamber within the oven 10 and allows a large item, such as a large turkey, to be cooked therein.

Although several embodiments have been described in some detail for purposes of illustration, various modifications may be made without departing from the scope and spirit of the invention. Accordingly, the invention is not to be limited, except as by the appended claims.

What is claimed is:

1. A counter-top electric oven, comprising:
   a head including an electric heating unit;
   an oven body having an upper opening configured to removably receive at least a portion of the electric heating unit therein;
   a dish disposed below the body and having an upper circumferential lip for accepting a lower edge of the body;
   a base for supporting the dish on a flat surface; and
   a holder slidably connected to the base so as to be retracted towards the base when the head and oven are in a closed cooking position, and extended away from the base for supporting the head and oven body when moved to an open position.

2. The oven of claim 1, wherein the electric heating unit comprises a heating lamp.

3. The oven of claim 1, including a rack resting on the dish within the oven.

4. The oven of claim 3, wherein the rack includes a first set of support legs extending from the rack, and a second set of support legs of a different length extending from an opposite side of the rack for supporting the rack at different heights relative to the dish.

5. The oven of claim 1, wherein the base partially surrounds the dish.

6. The oven of claim 1, wherein the dish is comprised of a glass material having handles formed integrally therewith.

7. The oven of claim 1, wherein the head houses a motor having a shaft connected to a first fan for cooling the motor, and a second fan for circulating air through the heating unit.

8. The oven of claim 7, wherein the head includes apertures formed in a top surface thereof for introducing air within the head, and a plurality of apertures formed in a skirt of the head for venting the air horizontally from the head.

9. The oven of claim 1, including a cooling chamber surrounding the heating unit.

10. The oven of claim 7, including an electronic control circuit for controlling the motor and the heating unit.

11. The oven of claim 1, including an expansion ring disposed between the oven body and the dish.

12. A counter-top electric oven, comprising:
    a head including an electric heating unit having a heating lamp and a grill underlying the heating lamp;
    an oven body having an upper opening configured to removably receive at least a portion of the electric heating unit therein;
    a glass dish disposed below the body and having an upper circumferential lip for accepting a lower edge of the body and handles integrally formed therewith; and
    a base for supporting the dish on a flat surface.

13. The oven of claim 12, including a holder slidably connected to the base so as to be retracted towards the base when the head and oven are in a closed cooking position, and extended away from the base for supporting the head and oven body when moved to an open position.

14. The oven of claim 12, including a rack resting on the dish within the oven.

15. The oven of claim 14, wherein the rack includes a first set of support legs extending from the rack, and a second set of support legs of a different length extending from an opposite side of the rack for supporting the rack at different heights relative to the dish.

16. The oven of claim 12, wherein the base partially surrounds the dish.

17. The oven of claim 12, wherein the head houses a motor having a shaft connected to a first fan for cooling the motor, and a second fan for circulating air through the heating unit.

18. The oven of claim 17, wherein the head includes apertures formed in a top surface thereof for introducing air within the head, and a plurality of apertures formed in a skirt of the head for venting the air horizontally from the head.

19. The oven of claim 12, including a cooling chamber surrounding the heating unit.

20. The oven of claim 17, including an electronic control circuit for controlling the motor and the heating unit.

21. The oven of claim 12, including an expansion ring disposed between the oven body and the dish.

22. A counter-top electric oven, comprising:
- a head including an electric heating unit having a heating lamp and a grill underlying the heating lamp, the head housing a motor having a shaft connected to a first fan for cooling the motor, and a second fan for circulating air through the heating unit, wherein the head includes apertures formed in a top surface thereof for introducing air within the head, and a plurality of apertures formed in a skirt of the head for venting the air horizontally from the head;
- an electronic control circuit for controlling the motor and the heating unit;
- an oven body having an upper opening configured to removably receive at least a portion of the electric heating unit therein;
- a glass dish disposed below the body and having an upper circumferential lip for accepting a lower edge of the body and handles integrally formed therewith;
- a rack resting on the dish within the oven, the rack including a first set of support legs extending from the rack, and a second set of support legs of a different length extending from an opposite side of the rack for supporting the rack at different heights relative to the dish;
- a base partially surrounding the dish for supporting the dish on a flat surface; and
- a holder slidably connected to the base so as to be retracted towards the base when the head and oven are in a closed cooking position, and extended away from the base for supporting the head and oven body when moved to an open position.

23. The oven of claim 22, including a cooling chamber surrounding the heating unit.

24. The oven of claim 22, including an expansion ring disposed between the oven body and the dish.

25. The oven of claim 22, wherein the grill is coated with a ceramic powder adapted to generate infrared radiations upon being heated in excess of a predetermined temperature.

* * * * *